United States Patent
Kim et al.

(10) Patent No.: US 8,412,122 B2
(45) Date of Patent: Apr. 2, 2013

(54) APPARATUS AND METHOD FOR ANTENNA MATCHING IN PORTABLE TERMINAL

(75) Inventors: Ki-Soo Kim, Suwon-si (KR); Yong-Joo Shin, Suwon-si (KR); Ki-Jeong Kwon, Suwon-si (KR); Yong-Jin Kim, Seoul (KR); Austin Kim, Seongnam-si (KR); Jae-Ho Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 367 days.

(21) Appl. No.: 12/835,110

(22) Filed: Jul. 13, 2010

(65) Prior Publication Data

US 2011/0077064 A1    Mar. 31, 2011

(30) Foreign Application Priority Data

Sep. 28, 2009    (KR) ................. 10-2009-0091604

(51) Int. Cl.
*H04B 1/40*    (2006.01)

(52) U.S. Cl. ...................... 455/87; 455/169.1
(58) Field of Classification Search .............. 455/423, 455/456.1, 77
See application file for complete search history.

(56) References Cited

U.S. PATENT DOCUMENTS

2008/0004000 A1*  1/2008  Boss et al. .................. 455/423
2010/0062728 A1*  3/2010  Black et al. .................... 455/77

* cited by examiner

*Primary Examiner* — Tu X Nguyen
(74) *Attorney, Agent, or Firm* — Jefferson IP Law, LLP

(57) ABSTRACT

An apparatus and method for antenna matching according to a position and an angle of a portable terminal is provided. Operations of the portable terminal include, when at least one of a position and an angle of the portable terminal is changed, determining an optimal Tunable Matching Network (TMN) set value corresponding to the position and the angle, and performing antenna matching according to the optimal TMN set value.

20 Claims, 2 Drawing Sheets ic application claims the benefit under 35 U.S.C. §119
APPARATUS AND METHOD FOR ANTENNA MATCHING IN PORTABLE TERMINAL

PRIORITY

This application claims the benefit under 35 U.S.C. §119(a) of a Korean patent application filed in the Korean Intellectual Property Office on Sep. 28, 2009 and assigned Serial No. 10-2009-0091604, the entire disclosure of which is hereby incorporated by reference.

BACKGROUND OF THE INVENTION

1. Field of the Invention

The present invention relates to a portable terminal. More particularly, the present invention relates to an apparatus and a method for antenna matching of a portable terminal.

2. Description of the Related Art

A transceiver apparatus for wireless communication includes an antenna and a transmission circuit in order to transmit and receive a wireless signal. However, mismatching between the antenna and the transmission circuit degrades performance of the transceiver apparatus. To address this antenna mismatching, a conventional method adopts a Fixed Matching Network (FMN) scheme using a fixed Inductor-Capacitor (LC) circuit. However, this method takes a considerable time to find an optimal matching value. Moreover, since it is impossible to change the LC circuit value according to the electric field in which the transceiver is operating, a Radio Frequency (RF) performance problem, in particular a problem such as a dropped call and a high talk current, frequently occurs when the transceiver operates in a weak electric field.

One technique devised to compensate for the drawbacks of the FMN scheme is a Tunable Matching Network (TMN) scheme. The TMN scheme accomplishes the antenna matching with the optimal value based on the electric field and the user environment using variable elements, rather than the fixed LC circuit. Thus, the RF performance is enhanced in various electric field situations without changing the antenna.

However, when the TMN scheme is applied, full consideration is not given to factors affecting the antenna radiation performance according to the manner and environment in which a portable terminal is actually used. Such consideration is necessary because the antenna radiation performance is greatly affected by the body effect and the environmental interface such as the position of the portable terminal. Hence, to optimize the antenna matching, it is necessary to consider various environmental characteristics. For example, the position or the direction in which the portable terminal is held exerts influence on the antenna performance. In this regard, there is a need for an improved method for tuning a TMN circuit.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for antenna matching in a portable terminal by taking account of a position and an angle of the portable terminal.

Another aspect of the present invention is to provide an apparatus and a method for determining an optimal Tunable Matching Network (TMN) circuit set value in a portable terminal according to a position and an angle of the portable terminal.

Yet another aspect of the present invention is to provide an apparatus and a method for determining an optimal TMN circuit set value using an acceleration sensor in a portable terminal.

In accordance with an aspect of the present invention, an operating method of a portable terminal is provided. The method includes when at least one of a position and an angle of the portable terminal is changed, determining an optimal TMN set value corresponding to the position and the angle, and performing antenna matching according to the optimal TMN set value.

In accordance with another aspect of the present invention, an apparatus of a portable terminal is provided. The apparatus includes a controller for, when at least one of a position and an angle of the portable terminal is changed, determining an optimal TMN set value corresponding to the position and the angle, and a TMN unit for performing antenna matching according to the optimal TMN set value.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
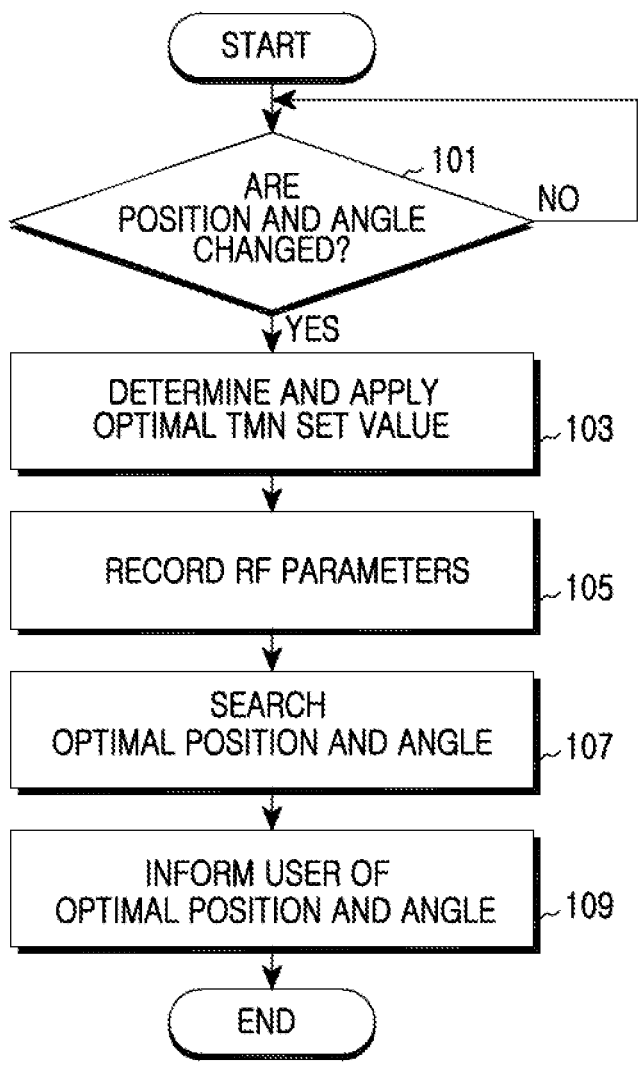
FIG. 1 is a flowchart illustrating operations of a portable terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for purposes of illustration only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The following description is made in the context of an Orthogonal Frequency Division Multiplexing/Orthogonal Frequency Division Multiple Access (OFDM/OFDMA) wireless communication system. However, it is to be understood that the present invention is not limited to this type of system. Thus, it should be clearly understood that the present invention is also applicable to any other wireless communication systems.

Exemplary embodiments of the present invention provide a technique for antenna matching in a portable terminal by taking into account a position and an angle of the portable terminal. Hereinafter, the term "portable terminal" encompasses cellular phones, Personal Communication Systems (PCSs), Personal Digital Assistants (PDAs), International Mobile Telecommunication (IMT)-2000 terminals, lap-top computers, desk-top computers, net-books, and the like.

Exemplary embodiments of the present invention use an acceleration sensor to determine the angle and the position of the portable terminal. The acceleration sensor determines a change in movement in the positive (+) direction along each axis of the orthogonal coordinate system with reference to the direction of gravity and determines the position and the angle of the portable terminal based on the results. The position and the angle determined using the acceleration sensor indicate the up/down and the vertical and horizontal changed angle of the portable terminal.

According to an exemplary embodiment of the present invention, the antenna matching varies depending on whether a Tunable Matching Network (TMN) function includes a self-tuning function. When the self-tuning function is not provided, the portable terminal may perform the antenna matching using a Look-Up Table (LUT) which stores optimal set values corresponding to positions and angles. Herein, the set values stored in the LUT are classified based on the band and the channel. An exemplary LUT is shown in Table 1.

TABLE 1

| Band | Channel | Direction | Tx set value | Rx set value |
|---|---|---|---|---|
| GSM850 | 128 | 0° | 51 | 51 |
| | | 45° | 55 | 54 |
| | | 315° | 58 | 56 |
| | 190 | 0° | 100 | 17 |
| | | 45° | 106 | 21 |
| | | 315° | 101 | 13 |
| | 251 | 0° | 100 | 17 |
| | | 45° | 105 | 19 |
| | | 315° | 103 | 18 |

In contrast, when the self-tuning function is provided, the portable terminal determines the optimal set value using the self-tuning function and executes the antenna matching.

According to an exemplary embodiment, the portable terminal not only performs the antenna matching but also searches for a position and/or angle of the portable terminal with which to optimize its power efficiency, and informs the user of the optimal position and/or angle. More specifically, to optimize power efficiency, the portable terminal determines and records the power consumption based on the matched antenna. In subsequent antenna matches, the portable terminal finds the position and the angle that minimizes the power consumption by comparing the recorded power consumptions.

Hereafter, exemplary operations and structures of the portable terminal for antenna matching are explained by referring to the drawings.

FIG. 1 is a flowchart illustrating operations of a portable terminal according to an exemplary embodiment of the present invention.

Referring to FIG. 1, in step 101, the portable terminal determines whether the position and/or the angle of the portable terminal is changed. For example, the portable terminal can recognize a change of the position and/or the angle using an embedded acceleration sensor. More specifically, using the acceleration sensor, the portable terminal determines a change in movement in the positive (+) direction along each axis of the orthogonal coordinate system with reference to the direction of gravity and determines the position and the angle based on the results. The position and the angle determined using the acceleration sensor indicate the up/down and the vertical and horizontal changed angle of the portable terminal.

If it is determined in step 101 that the position and/or the angle have changed, the portable terminal determines and applies an optimal TMN set value to a TMN circuit of the portable terminal in step 103. The determination of the optimal TMN set value varies depending on the presence or the absence of a self-tuning function. When the self-tuning function is not provided, the portable terminal determines the optimal TMN set value from an LUT using the position and the angle as look-up parameters. For example, the portable terminal may use the LUT as shown in Table 1. When the self-tuning function is provided, the portable terminal measures the reflected signal voltage in the antenna mismatch, and determines the optimal TMN set value using the reflected signal voltage. In more detail, the portable terminal determines Return Loss (RL) using the reflected signal voltage. The RL, which indicates the ratio of the reflected voltage and the incident voltage, is given by '−20 log|reflected voltage/incident voltage|[dB]', and is used as a performance index of the impedance match. A higher RL value signifies a better match. Accordingly, when the portable terminal changes the TMN set value, the portable terminal searches for the set value which maximizes the RL value. In an exemplary implementation, to prevent a limitless repetition of the operation, the portable terminal searches for the set value within a range satisfying a threshold number of times, an RL threshold, or a threshold of the RL change. Thus, the antenna matching at the current position and angle is accomplished.

In step 105, the portable terminal records the RF parameters of the matched antenna. Herein, the RF parameters include at least one of the transmit power level and the receive power level. In other words, the portable terminal records the current position and angle and at least one of the transmit power level and the receive power level based on the matched antenna at the current position and angle. Herein, the recorded RF parameters may be used to determine the position and the angle which minimize the power consumption of the portable terminal.

In step 107, the portable terminal searches for the optimal position and the optimal angle. That is, the portable terminal determines the position and the angle which minimize the power consumption. The portable terminal determines the optimal position and angle based on the recorded RF parameters according to the position and the angle. For example, the position and the angle when the transmit power level is minimized is selected as the optimal position and angle.

In step 109, the portable terminal informs the user of the optimal position and angle. For example, the portable terminal notifies the user of the optimal position and angle through a screen of a display means. Alternatively, the portable terminal may output a sound or other display indicating no optimal position or angle. That is, the portable terminal outputs a sound or other information to guide the user to maintain the current position and angle as there is no other position or angle that further reduces the power consumption.

In exemplary operations of the portable terminal as illustrated in FIG. 1, the TMN set value for the antenna matching is determined when the position and the angle are changed. Note however, that the TMN set value for the antenna matching need not always be determined only when the position and/or the angle are changed. Rather, determination of the TMN set value based on the change of the position and the angle as explained above is made merely to emphasize the features of the present invention. Accordingly, at any time when the TMN set value needs to change, such as when a change of channel, a change of the communication environment, and the like results in an antenna mismatch, the TMN set value can be determined.

Figure 2:
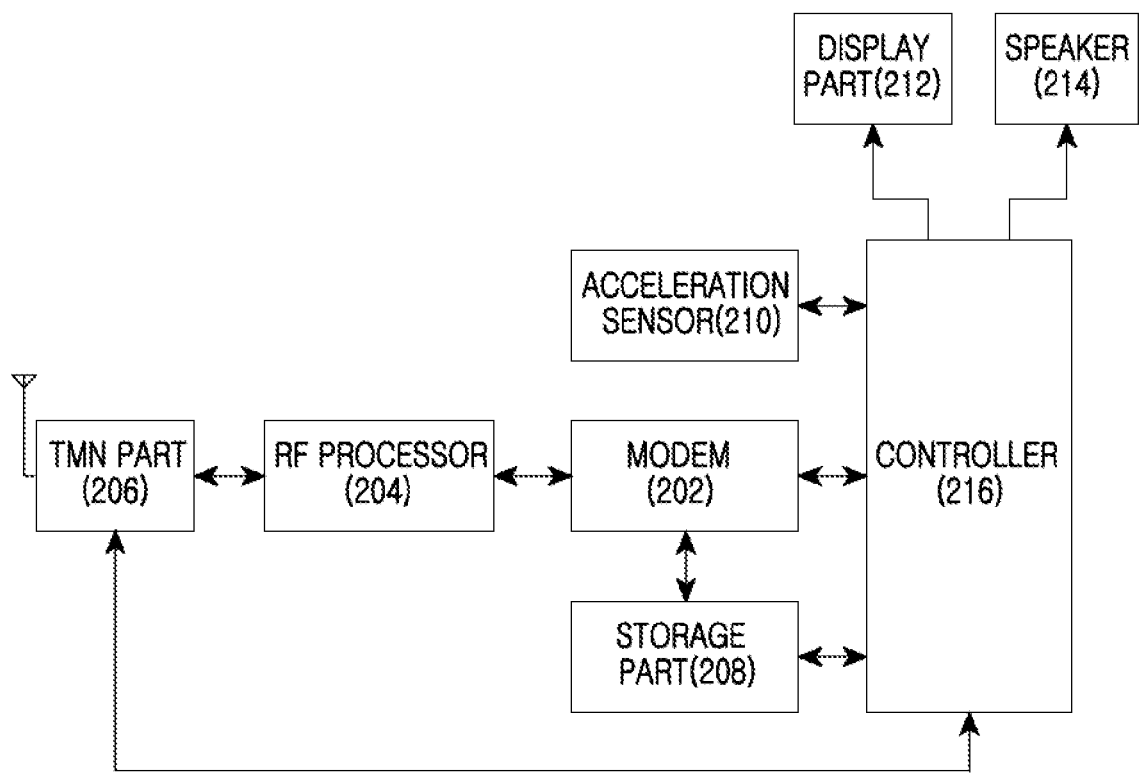
FIG. 2 is a block diagram of a portable terminal according to an exemplary embodiment of the present invention.

FIG. 2 is a block diagram of a portable terminal according to an exemplary embodiment of the present invention.

Referring to FIG. 2, the portable terminal includes a modem 202, an RF processor 204, a TMN unit 206, a storage unit 208, an acceleration sensor 210, a display unit 212, a speaker 214, and a controller 216.

The modem 202 modulates and demodulates the transmitted and received signals in the baseband.

The RF processor 204 processes the transmitted and received signals in the RF band. For example, the RF processor 204 amplifies the RF signals transmitted and received, and converts a baseband signal to and from an RF signal.

For antenna matching, the TMN unit 206 provides an inductance or capacitance to the link between the antenna and the RF processor 204. The TMN unit 206 determines the inductance value and the capacitance value according to the set value provided from the controller 216. When the TMN unit 206 includes a self-tuning function, the TMN unit 206 measures and provides the incident voltage and the reflected voltage to the controller 216.

The storage unit 208 stores program codes for the operation of the portable terminal, user contents, and data transmitted and received. The storage unit 208 outputs data for transmission to the modem 202 under the control of the controller 216, and stores data received and fed from the modem 202. When the TMN unit 205 does not include the self-tuning function, the storage unit 208 may store an LUT to determine the optimal TMN set value. For example, the LUT shown in Table 1 may be stored in the storage unit 208.

The acceleration sensor 210 measures a change of the movement of the portable terminal. More particularly, the acceleration sensor 210 determines a change in movement in the positive (+) direction along each axis of the orthogonal coordinate system with reference to the direction of gravity and determines the position and the angle of the portable terminal based on the results. The position and the angle determined using the acceleration sensor 210 indicate the up/down and the vertical and horizontal changed angle of the portable terminal. The acceleration sensor 210 provides the position and angle information of the portable terminal to the controller 216.

The display unit 212 displays status information generated during operation of the portable terminal, such as numerals, characters, and images generated during execution of an application program. That is, the display unit 212 displays image data output from the controller 216 as a visual screen. In an exemplary implementation, the display unit 212 can be implemented using a Liquid Crystal Display (LCD), an Organic Light Emitting Diode (OLED), and so on. The speaker 214 converts the electric sound signal output from the controller 216 to an auditory signal.

The controller 216 controls the functions of the portable terminal. For instance, the controller 216 controls to provide data for transmission that is stored in the storage unit 208 to the modem 202, and determines a Modulation and Coding Scheme (MCS) level to generate the baseband signal of the modem 202. More particularly, the controller 216 determines a TMN set value for antenna matching, and provides the TMN set value to the TMN unit 206. Exemplary operations of the controller 216 for determining the TMN set value are elucidated below.

The controller 216 determines the TMN set value optimized for the position and the angle measured by the acceleration sensor 210. Herein, the detailed process of the optimal TMN set value determination varies depending on the presence or the absence of the self-tuning function. When the self-tuning function is not provided, the controller 216 determines the optimal TMN set value from an LUT stored in the storage unit 208 using the position and the angle as the lookup parameters. When the self-tuning function is provided, the controller 216 determines the optimal TMN set value using the reflected voltage and the incident voltage provided from the TMN unit 206. In an exemplary implementation, the controller 216 determines the RL as discussed above. For changing the TMN set value, the controller 216 searches for a set value which maximizes the RL value. Yet, to prevent a limitless repetition of the operation, the controller 216 may search for the set value within a range satisfying a threshold number of times, an RL threshold, a threshold of the RL change, and the like.

The controller 216 also may function to inform the user of the optimal position and angle. In more detail, after providing the TMN set value to the TMN unit 206, that is, after the antenna matching, the controller 216 records the RF parameters. Herein, the RF parameters include at least one of the transmit power level and the receive power level. Next, the controller 216 searches for the optimal position and angle based on the recorded RF parameters. For example, the position and the angle with the minimum transmit power level is selected as the optimal position and angle. After searching for the optimal position and angle, the controller 216 informs the user of the optimal position and angle. For example, the controller 216 may display a screen notifying of the optimal position and angle through the display unit 212. Alternatively, the controller 216 may output a sound or display a screen indicating no optimal position and angle through the speaker 214, thus guiding the user to maintain the current position and angle.

In an exemplary implementation, the performance measured with the antenna matching technique as described above is shown in Table 2.

TABLE 2

| | | GSM850 | | GSM900 | | DCS1800 | | PCS1900 | | WCDMA | |
|---|---|---|---|---|---|---|---|---|---|---|---|
| | | TRP | TIS | TRP | TIS | TRP | TIS | TRP | TIS | TRP | TIS |
| free | Ref | 14.8 | 99.6 | 27.5 | 103.0 | 23.2 | 101.8 | 20.7 | 103.1 | 16.5 | 102.9 |
| | CS | 22.5 | 103.2 | 27.4 | 102.7 | 22.8 | 102.0 | 20.4 | 103.6 | 16.7 | 102.2 |
| | Δ | 7.7↑ | 3.6↑ | 0.1↓ | 0.3↓ | 0.4↓ | 0.2↑ | 0.3↓ | 0.5↑ | 0.2↑ | 0.7↓ |
| hand | Ref | 12.6 | 94.7 | 23.4 | 99.2 | 22.7 | 100.2 | 19.9 | 101.5 | 16.4 | 101.2 |
| | CS | 18.4 | 99.4 | 23.3 | 98.9 | 22.1 | 101.5 | 19.8 | 102.7 | 16.1 | 100.6 |
| | Δ | 5.8↑ | 407↑ | 0.1↓ | 0.3↓ | 0.6↓ | 1.3↑ | 0.1↓ | 1.2↑ | 0.3↓ | 0.6↓ |
| hand | Ref | 15.4 | 98.4 | 21.8 | 95.8 | 20.5 | 98.1 | 17.1 | 98.8 | 12.4 | 99.3 |
| | CS | 18.7 | 99.9 | 22.0 | 96.2 | 19.9 | 100.3 | 18.0 | 102.9 | 13.9 | 98.3 |
| | Δ | 3.3↑ | 1.5↑ | 0.2↑ | 0.4↑ | 0.6↓ | 2.2↑ | 0.9↑ | 4.1↑ | 1.5↑ | 1.0↓ |
| hand + | Ref | 10.9 | 94.1 | 17.6 | 92.0 | 20.3 | 96.7 | 17.3 | 96.5 | 11.6 | 97.7 |
| free | CS | 16.0 | 95.6 | 19.4 | 92.9 | 19.6 | 96.8 | 17.1 | 99.7 | 11.5 | 97.3 |
| | Δ | 5.0↑ | 1.5↑ | 1.8↑ | 0.9↑ | 0.7↓ | 0.1↑ | 0.2↓ | 3.2↑ | 0.1↓ | 0.4↓ |

In Table 2, the Global System for Mobile communications (GSM) 850, the GSM900, the Distributed Cellular System (DCS) 1800, the PCS1900, and the Wideband Code Division Multiple Access (WCDMA), which represent types of communication systems, have different bands. The Total Radiated Power (TRP) and the Total Isotropic Sensitivity (TIS) are indexes of the transmission performance and the reception performance of the wireless device in the free space. The TRP indicates the maximum transmit power when a Bit Error Rate (BER) reaches 2.44%. As the TRP value increases, the antenna matching works well and the reflected voltage is minimized. Thus, the RF performance of the portable terminal is enhanced.

As exemplary embodiments of the present invention maximize the efficiency of the radiated power using the same transmit power, a gain is attained in terms of the transmission in Table 2. By tracking the RF parameters after the antenna matching at each position and angle and informing the user of the position exhibiting the same RF performance with lower transmit power, the user is able to use the portable terminal at the corresponding position and angle. Thus, the current consumption is minimized and the battery lifespan can be extended.

By determining the TMN set value by taking into account the position and the angle of the portable terminal, more accurate antenna matching can be achieved. Further, the gain of the transmit power is enhanced by minimizing the reflected power.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a portable terminal, the method comprising:
   determining an optimal Tunable Matching Network (TMN) set value corresponding to at least one of a direction and an angle of the portable terminal when at least one of the direction and the angle of the portable terminal is changed; and
   performing antenna matching according to the optimal TMN set value,
   wherein the determining of the optimal TMN set value comprisesdetermining the optimal TMN set value in a Look-Up Table (LUT) using the direction and the angle as look-up parameters.

2. The method of claim 1, further comprising:
   recording at least one of a receive power level and a transmit power level when the antenna matching is completed.

3. The method of claim 2, further comprising:
   determining at least one of an optimal direction and an optimal angle based on at least one of the receive power level and the transmit power level according to a stored direction and angle; and
   informing a user of the at least one of the optimal direction and the optimal angle.

4. The method of claim 3, wherein the informing of the at least one of the optimal direction and the optimal angle comprises:
   displaying a screen notifying of the at least one of the optimal direction and the optimal angle in a display means.

5. The method of claim 3, wherein the informing of the at least one of the optimal direction and the optimal angle comprises:
   outputting a sound indicating no optimal direction and angle.

6. The method of claim 1, further comprising:
   determining a change of the at least one of the direction and the angle of the portable terminal using an acceleration sensor.

7. The method of claim 6, wherein the determining of the change of the at least one of the direction and the angle of the portable terminal using an acceleration sensor comprises,
   determining a change in movement in the positive (+) direction along each axis of the orthogonal coordinate system with reference to the direction of gravity.

8. A method for operating a portable terminal, the method comprising:
   determining an optimal Tunable Matching Network (TMN) set value corresponding to at least one of a direction and an angle of the portable terminal when at least one of the direction and the angle of the portable terminal is changed; and
   performing antenna matching according to the optimal TMN set value,
   wherein the determining of the optimal TMN set value comprises:
   measuring a reflected signal voltage caused by antenna mismatch; and
   determining the optimal TMN set value using the reflected signal voltage.

9. The method of claim 8, wherein the determining of the optimal TMN set value using the reflected signal voltage comprises:
   determining a Return Loss (RL) using the reflected signal voltage; and
   determining a set value which maximizes the RL value while changing the TMN set value.

10. The method of claim 9, wherein the determining of the RL comprises using the equation −20 log|reflected voltage/incident voltage|[dB].

11. An apparatus of a portable terminal, the apparatus comprising:
   a controller for determining an optimal Tunable Matching Network (TMN) set value corresponding to at least one of a direction and an angle of the portable terminal when at least one of the direction and the angle of the portable terminal is changed; and
   a TMN unit for performing antenna matching according to the optimal TMN set value,
   wherein the controller determines the optimal TMN set value in a Look-Up Table (LUT) using the direction and the angle as look-up parameters.

12. The apparatus of claim 11, wherein the controller records at least one of a receive power level and a transmit power level when the antenna matching is completed.

13. The apparatus of claim 12, wherein the controller determines at least one of an optimal direction and an optimal angle based on the at least one of the receive power level and the transmit power level according to a stored direction and angle, and informs a user of the optimal direction and angle.

14. The apparatus of claim 13, further comprising:
   a display unit for displaying a screen notifying of the at least one of the optimal direction and the optimal angle under control of the controller.

15. The apparatus of claim 13, further comprising:
   a speaker for outputting a sound indicating no optimal direction and angle under control of the controller.

16. The apparatus of claim 11, wherein the controller determines a change of the at least one of the direction and the angle of the portable terminal using an acceleration sensor.

17. The apparatus of claim 16, therein the controller determines a change in movement in the positive (+) direction along each axis of the orthogonal coordinate system with reference to the direction of gravity.

18. An apparatus of a portable terminal, the apparatus comprising:
   a controller for determining an optimal Tunable Matching Network (TMN) set value corresponding to at least one of a direction and an angle of the portable terminal when at least one of the direction and the angle of the portable terminal is changed; and
   a TMN unit for performing antenna matching according to the optimal TMN set value,
   wherein the controller measures a reflected signal voltage caused by antenna mismatch, and determines the optimal TMN set value using the reflected signal voltage.

19. The apparatus of claim 18, wherein the controller determines a Return Loss (RL) using the reflected signal voltage, and determines a set value which maximizes the RL value while changing the TMN set value.

20. The apparatus of claim 19, wherein the determining of the RL comprises using the equation −20 log|reflected voltage/incident voltage|[dB].

* * * * *